G. AND J. G. STIRK.
DIRECT CURRENT MOTOR AND GENERATOR.
APPLICATION FILED SEPT. 18, 1920.
1,407,958.
Patented Feb. 28, 1922.
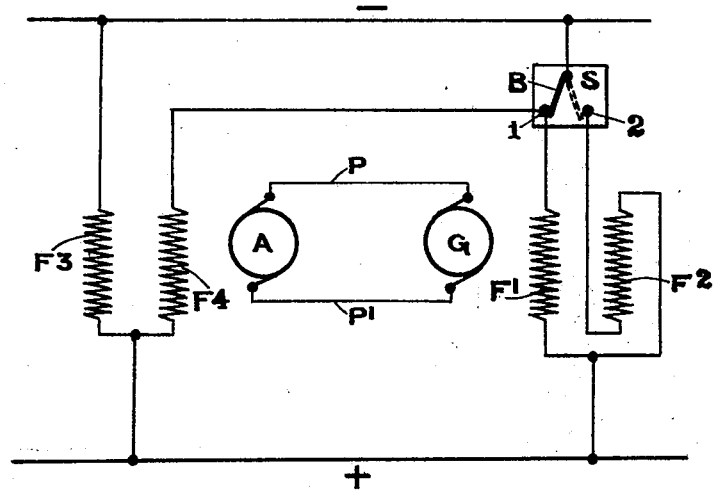

UNITED STATES PATENT OFFICE.

GREENWOOD STIRK AND JOHN GEORGE STIRK, OF HALIFAX, ENGLAND.

DIRECT-CURRENT MOTOR AND GENERATOR.

1,407,958.　　　　　　Specification of Letters Patent.　　Patented Feb. 28, 1922.

Application filed September 18, 1920. Serial No. 411,227.

(GRANTED UNDER THE PROVISIONS OF THE ACT OF MARCH 3, 1921, 41 STAT. L., 1313.)

*To all whom it may concern:*

Be it known that we, GREENWOOD STIRK and JOHN GEORGE STIRK, subjects of the King of Great Britain, residing at Halifax, in the county of York, England, have invented Improvements in Direct-Current Motors and Generators, of which the following is a specification.

This invention relates to the simplification of connections and switch gear for separately excited direct current electric motors and generators.

It is proposed, in lieu of reversing field connections as is commonly resorted to at present to accomplish reversal of polarity in the case of generators, and direction of rotation in the case of motors, and for varying voltage or speed respectively, to divide separately excited field windings of both motor and generator into sections and by bringing these into play alternately by a single-pole change-over switch, or a simple two-way switch, to accomplish the same results as by the customary methods of manipulating connections. Magnetically operated switches or contactors may be used in place of the two-way switch referred to.

Considerable economies in switches and regulators may be achieved by the use of our invention, and the system is specially suitable for reversing motor drives in which a motor and a generator work together as in present systems for rolling mills, planing machines, ship or vehicle propulsion or the like.

The accompanying drawing shows diagrammatically our invention applied to reversing motor drives in which current is supplied to the motor by a separate generator.

A is the armature of an electric motor, and G the armature of a generator working together. $F^1$, $F^2$ are two sections of the separately excited field windings of the generator, and $F^3$, $F^4$ are two sections of the separately excited field windings of the motor. Both windings $F^1$, $F^2$ being in this case independently excited or connected across the mains, have reversed connections connected with the positive main and to contacts 1, 2, of a single-pole change-over switch or the like S connected with the negative main. $F^3$ is permanently across the mains, whilst $F^4$ is connected to the positive main and to the contact 1 of the switch S before mentioned.

To reverse polarity of a D. C. generator and thereby reverse direction of rotation of the motor to which it is supplying current and to vary the speed of the latter assuming the generator to be in motion by any convenient means either belt alternating or direct current motor the switch bar B being in contact with 1 as shown in the drawing and direct mains + and — being alive, a circuit is completed from the positive main through $F^1$ and switch arm B to negative main. The generator consequently generates an electromotive force and P and $P^1$ are positive and negative respectively. A second circuit however is simultaneously completed through $F^4$, arm B to negative main and the motor rotates in clockwise direction at minimum speed corresponding to maximum field strength.

Upon changing over the arm B to 2 as shown in dotted lines, a circuit is completed through $F^2$ causing the generator to generate opposite polarity and P, $P^1$ become negative and positive respectively. The motor field remains unaltered in polarity but is reduced in strength because $F^4$ is not now in circuit, consequently the motor rotates anti-clockwise at an increased speed.

Regulators may be introduced in either motor or generator field to widen the speed variation and a supplementary switch introduced to alternatively increase and decrease speeds if desired, but these are irrelevant to the invention and have not been shown.

As mentioned in the earlier description, contactors or magnetically operated switches may be employed if desired, but these also have not been shown in order that the essential features of our invention may not be obscured.

What we claim as our invention and desire to secure by Letters Patent is:—

A direct current motor and generator connected in series, in which the sections of the motor field are connected in agreement one section being permanently in circuit, the other section being connected to the single pole change-over switch, whereby on operating the said switch to reverse the polarity of the generator and the direction of rotation of the motor, a circuit is alternately opened and closed through the latter section to vary the speed of the motor.

In testimony whereof we have signed our names to this specification in the presence of two witnesses.

GREENWOOD STIRK.
JOHN GEORGE STIRK.

Witnesses:
ABER REED,
R. B. NICHOLLS.